United States Patent
Liu

(10) Patent No.: US 11,100,202 B2
(45) Date of Patent: Aug. 24, 2021

(54) FINGERPRINT RECOGNITION METHOD AND DEVICE FOR TOUCH SCREEN, AND TOUCH SCREEN

(71) Applicant: BOE TECHNOLOGY GROUP CO., LTD., Beijing (CN)

(72) Inventor: Kairan Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 258 days.

(21) Appl. No.: 15/519,951

(22) PCT Filed: Mar. 14, 2016

(86) PCT No.: PCT/CN2016/076259
§ 371 (c)(1),
(2) Date: Apr. 18, 2017

(87) PCT Pub. No.: WO2017/045386
PCT Pub. Date: Mar. 23, 2017

(65) Prior Publication Data
US 2017/0372050 A1    Dec. 28, 2017

(30) Foreign Application Priority Data
Sep. 18, 2015   (CN) .......................... 201510600149.8

(51) Int. Cl.
*H04L 29/06*    (2006.01)
*G06F 21/32*    (2013.01)

(52) U.S. Cl.
CPC .................................... *G06F 21/32* (2013.01)

(58) Field of Classification Search
CPC ............. H04L 9/00; G06F 21/00; G06F 21/32
See application file for complete search history.

(56) References Cited

U.S. PATENT DOCUMENTS 7,856,248 B1 * 12/2010 Fujisaki .............. H04M 1/0266
455/556.1
2001/0054154 A1 * 12/2001 Tam ..................... G06Q 20/341
713/186
(Continued)

FOREIGN PATENT DOCUMENTS

CN    202108335 U    1/2012
CN    102393983 A    3/2012
(Continued)

OTHER PUBLICATIONS

Office Action issued by the Chinese Patent Office dated Aug. 31, 2017.
(Continued)

*Primary Examiner* — Joseph P Hirl
*Assistant Examiner* — Leynna Truvan
(74) *Attorney, Agent, or Firm* — Dilworth & Barrese, LLP.; Michael J. Musella, Esq.

(57) ABSTRACT

A fingerprint recognition method and device for a touch screen, and a touch screen. The fingerprint recognition method for a touch screen includes: determining a fingerprint code input by a user; and comparing the fingerprint code input by the user with at least two pre-set fingerprint codes, and when the fingerprint code input by the user is the same as a fingerprint code in the at least two pre-set fingerprint codes, executing an operation corresponding to the fingerprint code. The fingerprint recognition method and device and the touch screen can improve the security of the touch screen, so as to ensure the personal and property safety of a user.

16 Claims, 4 Drawing Sheets

S101 — Determining a fingerprint code inputted by a user

S102 — Comparing the fingerprint code inputted by the user with at least two pre-set fingerprint codes, and when the fingerprint code inputted by the user is the same as a fingerprint code in the pre-set fingerprint codes, executing an operation corresponding to the fingerprint code

(56) References Cited

U.S. PATENT DOCUMENTS

| | | | | |
|---|---|---|---|---|
| 2008/0313726 A1* | 12/2008 | Gardner | ............... | H04L 9/3273 |
| | | | | 726/9 |
| 2009/0282258 A1* | 11/2009 | Burke | .................... | G06F 21/46 |
| | | | | 713/184 |
| 2012/0174214 A1* | 7/2012 | Huang | ................... | G06F 21/32 |
| | | | | 726/19 |

FOREIGN PATENT DOCUMENTS

| | | | |
|---|---|---|---|
| CN | 102737194 | A | 10/2012 |
| CN | 103294963 | A | 9/2013 |
| CN | 103366107 | A | 10/2013 |
| CN | 103595719 | A | 2/2014 |
| CN | 104933343 | A | 9/2015 |
| CN | 105095721 | A | 11/2015 |
| CN | 105243307 | A | 1/2016 |
| DE | 102005034818 | A1 | 2/2007 |

OTHER PUBLICATIONS

Search Report and Written Opinion dated Jun. 1, 2016 from State Intellectual Property Office of the P.R. China.

* cited by examiner

FINGERPRINT RECOGNITION METHOD AND DEVICE FOR TOUCH SCREEN, AND TOUCH SCREEN

TECHNICAL FIELD

Embodiments of the present disclosure relate to fingerprint recognition method and device for a touch screen, and a touch screen.

BACKGROUND

Touch screens are widely applied in various smart devices. Taking currently mobile phones that are widely applied as an example, with the improvement of the technical level of the field of mobile phones, the mobile phones have more and more functions, for instance, the currently widely applied mobile payment service and the installation of software clients of a variety of shopping sites on the mobile phones. However, all the applications (Apps) must be bound with the owner's personal information or credit card information. Currently, the unlocking passwords of the mobile phones and the passwords of the apps are only digitals, letters or combinations thereof. When a mobile phone is lost or stolen, these kinds of passwords can be easily cracked, resulting in the leakage of important information of the owner.

In recent years, with the popularization and development of the fingerprint recognition technology, fingerprint recognition unlocking is widely used for the unlocking of mobile phones. The currently commonly used fingerprint recognition unlocking technology adopts a single fingerprint for recognition. When a single fingerprint inputted by a user is the same as a preset unlocking fingerprint in a mobile phone, the mobile phone is unlocked.

SUMMARY

Embodiments of the present disclosure provide fingerprint recognition method and device for a touch screen, and a touch screen, which are used for improving the safety of the touch screen and guaranteeing the personal and property safety of users.

At least one embodiment of the present disclosure provides a fingerprint recognition method for a touch screen, comprising: determining a fingerprint code inputted by a user; comparing the fingerprint code inputted by the user with at least two preset fingerprint codes; and in a case where the fingerprint code inputted by the user is the same as the one fingerprint code in the at least two preset fingerprint codes, executing an operation corresponding to the one fingerprint code.

At least one embodiment of the present disclosure provides a fingerprint recognition device for a touch screen, comprising: a fingerprint determination unit configured to determine a fingerprint code inputted by a user; a comparison unit configured to compare the fingerprint code inputted by the user with at least two preset fingerprint codes; and an execution unit configured, in a case where the fingerprint code inputted by the user is the same as the one fingerprint code in the at least two preset fingerprint codes, to execute an operation corresponding to the one fingerprint code.

At least one embodiment of the present disclosure provides a touch screen comprising the above-mentioned fingerprint recognition device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The inventor of the present application has noted in study that: the security level of a preset single fingerprint in the currently commonly used fingerprint recognition unlocking technology has been unable to meet the current requirements, for instance, as for some confidential Apps having higher confidentiality levels, when the unlocking fingerprint is cracked, the confidential Apps in a smart device cannot be protected.

In summary, the currently commonly used smart devices have poor safety levels, resulting in the leakage of personal information of users and the cracking of various types of accounts.

Embodiments of the present disclosure provide a fingerprint recognition method for a touch screen, and a touch screen, which are used for improving the safety of the touch screen and guaranteeing the personal and property safety of users.

Detailed description will be given below to the fingerprint recognition method and device for the touch screen, and the touch screen, provided by the embodiment of the present disclosure, with reference to the accompanying drawings.

Figure 1:
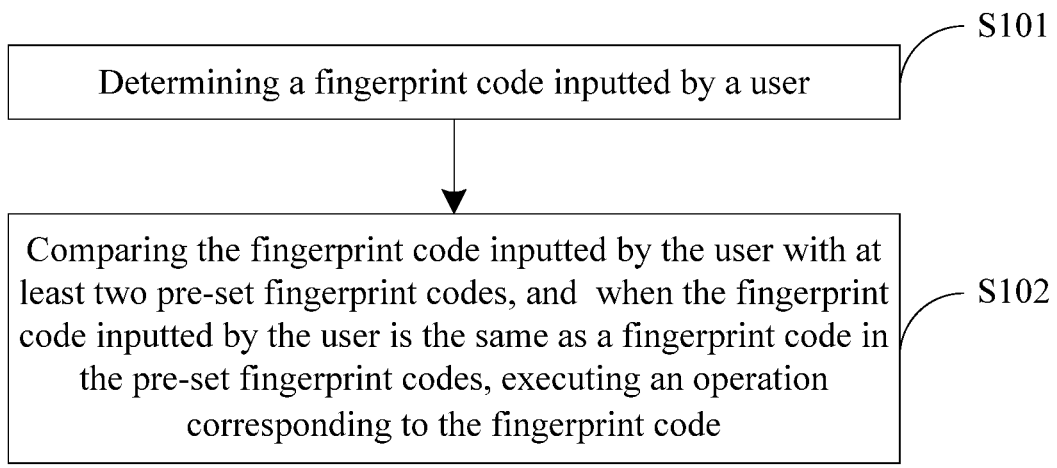
FIG. 1 is a flowchart of a fingerprint recognition method for a touch screen, provided by an embodiment of the present disclosure.

As illustrated in FIG. 1, at least one embodiment of the present disclosure provides a fingerprint recognition method for a touch screen. The method comprises operations: S101, determining a fingerprint code inputted by a user; and S102, comparing the fingerprint code inputted by the user with at least two preset fingerprint codes (including at least two fingerprints), and in a case where the fingerprint code inputted by the user is the same as one preset fingerprint code, executing an operation corresponding to the one fingerprint code.

For instance, the at least two preset fingerprint codes include at least a first fingerprint code group and a second fingerprint code group (namely the at least two preset fingerprint codes are divided into at least the first fingerprint code group and the second fingerprint code group); both the first fingerprint code group and the second fingerprint code group each include at least one fingerprint code; and description is given in at least one embodiment of the present disclosure by taking the case that the first fingerprint code group is a user identification fingerprint and the second fingerprint code group is an SOS fingerprint as an example. During an actual operation, when the fingerprint code inputted by the user is the same as the one fingerprint code in the first fingerprint code group, the touch screen executes user identification, and the unlocking function of the touch screen can be achieved or other Apps of the touch screen can be accessed after identification; and when the fingerprint code inputted by the user is the same as the one fingerprint code in the second fingerprint code group, the touch screen achieves the SOS function, and the specific unlocking process and the SOS process will be given below. For instance, when the first fingerprint code group includes one fingerprint code, the fingerprint code inputted by the user is the same as the first fingerprint code group; and similarly, when the second fingerprint code group includes one fingerprint code, the fingerprint code inputted by the user is the same as the second fingerprint code group.

For instance, in at least one embodiment, each of the preset fingerprint codes includes a single fingerprint and/or a fingerprint sequence formed by a plurality of fingerprints, namely each fingerprint code in the at least two preset fingerprint codes may include a single fingerprint, or include a fingerprint sequence formed by a plurality of fingerprints, or include both the single fingerprint and the fingerprint sequence formed by the plurality of fingerprints. The fingerprint sequence in the specific embodiment of the present disclosure is a sequence formed by the arrangement of No. 1 to No. N (here N is greater than or equal to 2) fingerprints (namely the arrangement of fingerprints from the Pt fingerprint to the $N^{th}$ fingerprint) in order. When the first fingerprint code group in the specific embodiment of the present disclosure is, for instance, a fingerprint sequence, the touch screen has higher security level in practice.

Figure 2:
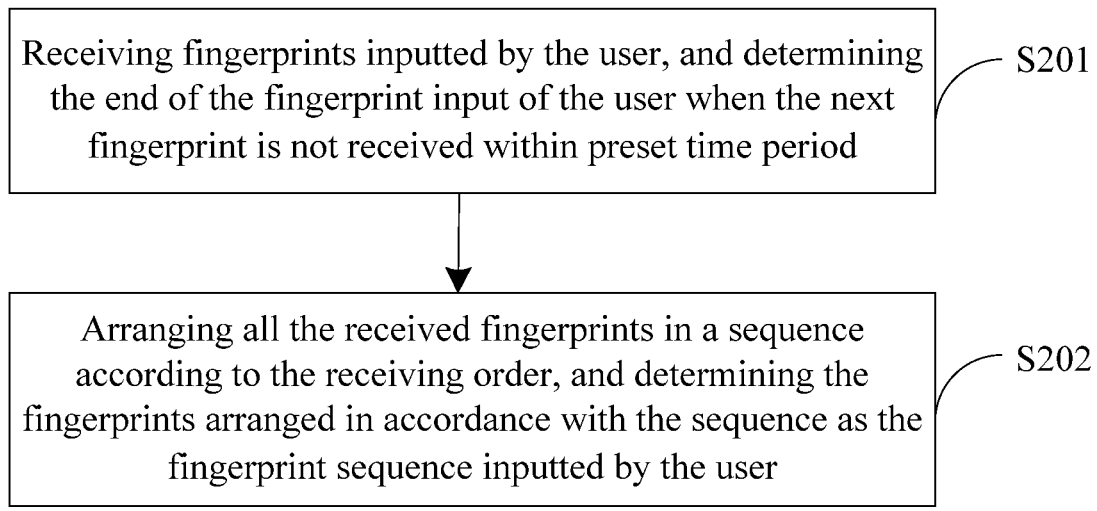
FIG. 2 is a flow diagram of a method for determining a fingerprint sequence inputted by a user in an embodiment of the present disclosure.

For instance, as illustrated in FIG. 2, in the case where the fingerprint code in at least one embodiment of the present disclosure includes a fingerprint sequence, the operation of determining the fingerprint code inputted by the user in step S101 includes the operation of determining the fingerprint sequence inputted by the user. For instance, the operation of determining the fingerprint sequence inputted by the user may include the following operations: S201, receiving fingerprints inputted by the user, and determining the end of the fingerprint input of the user when a following fingerprint is not received within a preset time period; and S202, arranging all the fingerprints that are received in a sequence according to an order of receiving the fingerprints, and determining the fingerprints arranged in accordance with the sequence as the fingerprint sequence inputted by the user.

In an embodiment of the present disclosure, when the fingerprints are inputted by the user, for instance, 1 to 10 different fingerprints may be inputted. The type and number of the inputted fingerprints are set according to actual demands of users. During an actual input process, the number of inputting the same type of fingerprints is greater than 1. For instance, when the fingerprints are inputted by the user, the fingerprint of the forefinger of the left hand can be inputted twice.

For instance, during fingerprint input, the preset time period may be elected between two adjacent fingerprint inputs. For instance, in specific implementation, the preset time period between two adjacent fingerprint inputs is 30 seconds; and if the touch screen does not receive the next fingerprint inputted by the user within the preset time period, the fingerprint input of the user is determined to be ended. For instance, if the user needs to input five fingerprints, during an actual input process, after the user inputs the first fingerprint, the time spent for inputting the second fingerprint is 10 seconds; after the user inputs the second fingerprint, the time spent for inputting the third fingerprint is 5 seconds; after the user inputs the third fingerprint, the time spent for inputting the fourth fingerprint is 20 seconds; and after the user inputs the fourth fingerprint, the time spent for inputting the fifth fingerprint is 50 seconds. As the time spent for inputting the fifth fingerprint exceeds the preset time period, the inputted fifth fingerprint is regarded as an invalid fingerprint, so the number of fingerprints actually inputted by the user, determined by the touch screen, is four.

Detailed description is given in at least one embodiment of the present disclosure by taking the case that the number of fingerprints inputted by the user, received by the touch screen, is five as an example. As all the fingerprints on two hands of the user are different from each other, each fingerprint is taken as an element of a password; when the number of fingerprints inputted by the user is five and the types of the inputted fingerprints (namely the inputted fingerprints respectively correspond to different fingers) are not repeated, in view of the arrangement mode, the five fingerprints have 120 arrangement modes, namely the fingerprint sequence formed by the five fingerprints inputted by the user has 120 different sequences. For instance, the five fingerprints inputted by the users, received by the touch screen, are arranged in a sequence according to an order of receiving the fingerprints, and the five fingerprints arranged in accordance with the sequence are determined as the fingerprint sequence inputted by the user. When the five fingerprints inputted by the user are respectively the fingerprint of the forefinger and the fingerprint of the middle finger of the left hand, and the fingerprint of the forefinger, the fingerprint of the ring finger and the fingerprint of the little finger of the right hand, if the order of fingerprint input of the user is the forefinger of the left hand, the ring finger of the right hand, the forefinger of the right hand, the middle finger of the left hand, and the little finger of the right hand, the fingerprint sequence inputted by the user, determined by the touch screen, is the fingerprint of the forefinger of the left hand, the fingerprint of the ring finger of the right hand, the fingerprint of the forefinger of the right hand, the fingerprint of the middle finger of the left hand, and the fingerprint of the little finger of the right hand.

For instance, in at least one embodiment of the present disclosure, the first fingerprint code group may include a plurality of first fingerprint sequences; the second fingerprint code group may include a plurality of second fingerprint sequences; and the fingerprint code inputted by the user may be a fingerprint sequence. In this case, the fingerprint sequence inputted by the user can be compared with the preset first fingerprint sequences and the preset second fingerprint sequences.

For instance, the operation of comparing the fingerprint sequence inputted by the user with the preset first fingerprint sequence(s) and the preset second fingerprint sequence(s)

may include: comparing the number of fingerprints in the fingerprint sequence inputted by the user with the number of fingerprints in the preset fingerprint sequences, determining the preset fingerprint sequence(s) of which the number of fingerprints is the same as the number of fingerprints in the fingerprint sequence inputted by the user, and taking the determined preset fingerprint sequence(s) as the fingerprint sequence(s) to be compared; and comparing the fingerprint sequence inputted by the user with the fingerprint sequence(s) to be compared in turn according to the order of the fingerprint sequence(s) to be compared, and directly ending the comparison process if the fingerprint sequence inputted by the user is the same as one fingerprint sequence in the fingerprint sequence(s) to be compared.

In the embodiment of the present disclosure, for example, firstly, the number of fingerprints in the fingerprint sequence inputted by the user is compared with the number of fingerprints in the preset fingerprint sequences; the preset fingerprint sequences of which the number of fingerprints is the same as the number of fingerprints in the fingerprint sequence inputted by the user are determined; the preset fingerprint sequences that are determined are taken as the fingerprint sequences to be compared; and subsequently, the touch screen only needs to compare the fingerprint sequence inputted by the user with the determined fingerprint sequences to be compared, so that the comparison time can be saved.

Secondly, the fingerprint sequence inputted by the user is compared with the fingerprint sequences to be compared in turn according to the order of the fingerprint sequences to be compared; if the fingerprint sequence inputted by the user is the same as one fingerprint sequence in the fingerprint sequences to be compared, the comparing process is directly ended; and the fingerprint sequence inputted by the user is not compared with the fingerprint sequences to be compared after the one fingerprint sequence any more, so that the comparison time can be also saved.

In at least one embodiment of the present disclosure, in the process of comparing the fingerprint sequence inputted by the user with any fingerprint sequence in the fingerprint sequences to be compared, the comparison method is one-to-one comparison. Following the example described above, if the fingerprint sequence inputted by the user is the fingerprint of the forefinger of the left hand, the fingerprint of the ring finger of the right hand, the fingerprint of the middle finger of the left hand, the fingerprint of the little finger of the right hand, and the fingerprint of the little finger of the left hand, and one fingerprint sequence in the fingerprint sequences to be compared is the fingerprint of the forefinger of the left hand, the fingerprint of the ring finger of the right hand, the fingerprint of the forefinger of the right hand, the fingerprint of the middle finger of the left hand, and the fingerprint of the little finger of the right hand, then in the comparison process, the fingerprints are in one-to-one comparison according to the position order of the fingerprints in the fingerprint sequence, namely whether the fingerprints at the first positions in the fingerprint sequences are the same is compared at first, and subsequently, whether the fingerprints at each position in the fingerprint sequences are the same is compared successively according to the order; and as known by the comparison, the fingerprints at the third positions are different, so the fingerprint sequence inputted by the user is different from the fingerprint sequence to be compared.

For instance, in at least one embodiment of the present disclosure, if the fingerprint code inputted by the user is the same as the one fingerprint code in the preset first fingerprint code group or one fingerprint code in the preset second fingerprint code group, an operation corresponding to the first fingerprint code group or the second fingerprint code group is executed. For instance, the process of executing the operation corresponding to the first fingerprint code group or the second fingerprint code group may include: performing user identification when the fingerprint code inputted by the user is the same as the one fingerprint code in the first fingerprint code group; and turning on the secrete SOS mode or giving out an alarm when the fingerprint code inputted by the user is the same as the one fingerprint code in the second fingerprint code group.

Figure 3:
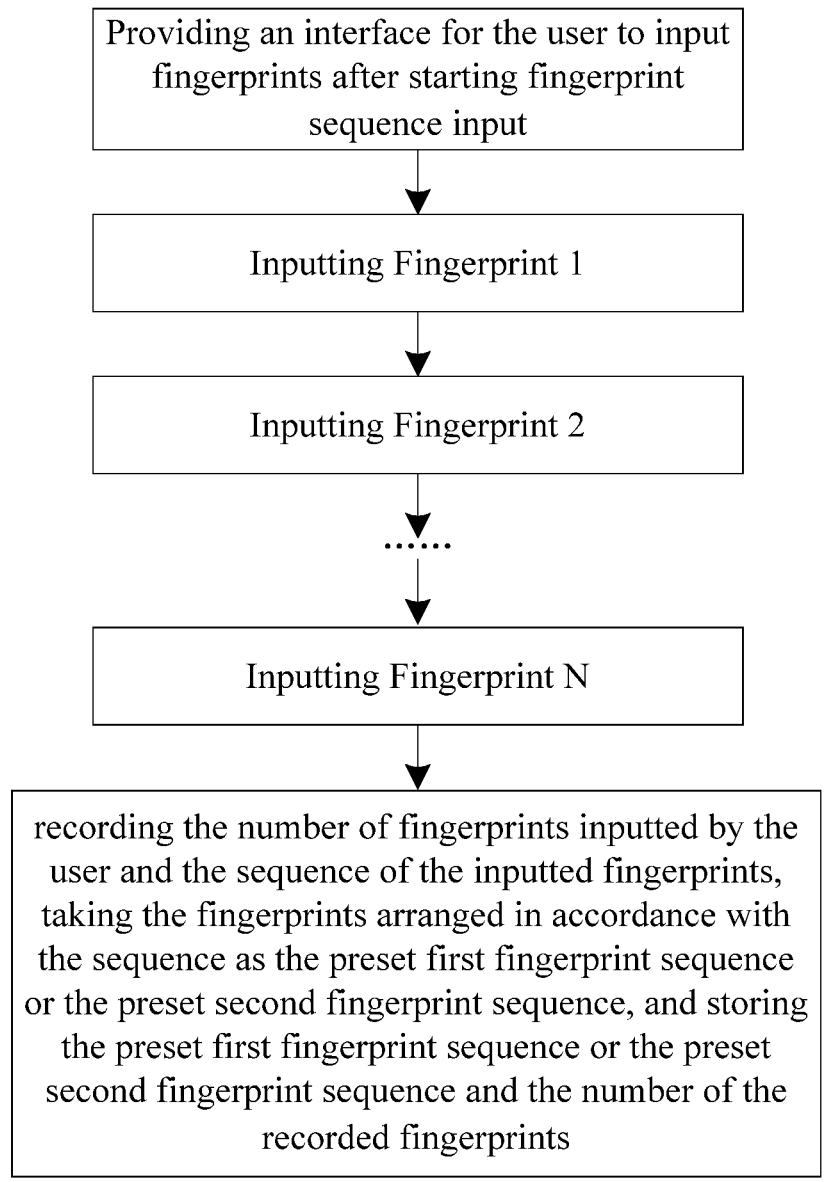
FIG. 3 is a flow diagram of a method for presetting a first fingerprint sequence or a second fingerprint sequence in an embodiment of the present disclosure.

For instance, in at least one embodiment of the present disclosure, the first fingerprint code group may include a plurality of first fingerprint sequences, and the second fingerprint code group may include a plurality of second fingerprint sequences. In this case, mainly taking the implementation of the unlocking function of the touch screen after user identification as an example, as illustrated in FIG. 3, in at least one embodiment of the present disclosure, the operation of presetting the first fingerprint sequence and the second fingerprint sequence may include the following steps: providing an interface for the user to input a fingerprint after starting the process of fingerprint sequence input; receiving all the fingerprints inputted by the user; and recording the number of fingerprints inputted by the user and the sequence of the inputted fingerprints, taking the fingerprints arranged in accordance with the sequence as the preset first fingerprint sequence or the preset second fingerprint sequence, and storing the preset first fingerprint sequence or the preset second fingerprint sequence and the number of the recorded fingerprints.

Description will be given below by taking the case of presetting the first fingerprint sequence as an example. Following the example described above, description is given here by still taking the case that the number of the fingerprints inputted by the user is five (5) as an example, and the value of the number "N" in N inputted fingerprints in FIG. 3 is five. If fingerprint 1 inputted by the user is the fingerprint of the forefinger of the left hand, fingerprint 2 inputted by the user is the fingerprint of the ring finger of the right hand, fingerprint 3 inputted by the user is the fingerprint of the forefinger of the right hand, fingerprint 4 inputted by the user is the fingerprint of the middle finger of the left hand, and fingerprint 5 inputted by the user is the fingerprint of the little finger of the right hand, the preset first fingerprint sequence stored by the touch screen is the sequence of the fingerprint of the forefinger of the left hand, the fingerprint of the ring finger of the right hand, the fingerprint of the forefinger of the right hand, the fingerprint of the middle finger of the left hand, and the fingerprint of the little finger of the right hand, and the number of the fingerprints is five.

In the embodiment of the present disclosure, the method of presetting the second fingerprint sequence is the same as the method of presetting the first fingerprint sequence. No further description will be given here.

Figure 4:
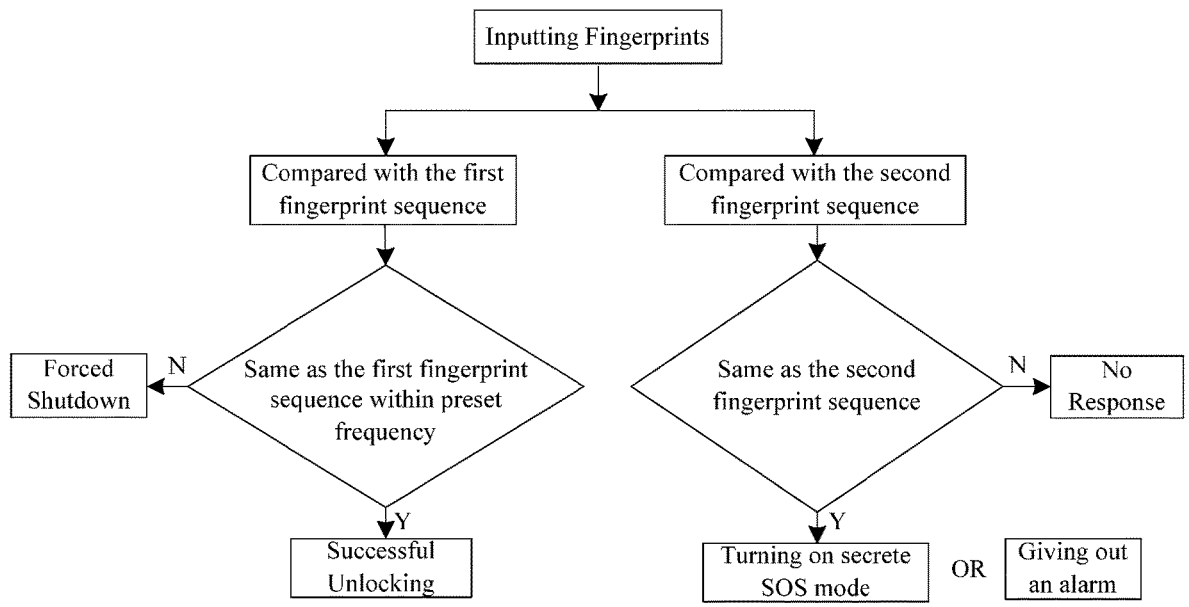
FIG. 4 is a flow diagram of a method for operating a touch screen after fingerprints are inputted by a user in an embodiment of the present disclosure.

For instance, as illustrated in FIG. 4, in at least one embodiment of the present disclosure, firstly, the fingerprint sequence inputted by the user is compared with the preset first fingerprint sequence and the preset second fingerprint sequence by the method described above. When the fingerprint sequence inputted by the user is the same as the first fingerprint sequence, the unlocking of the touch screen is determined. For instance, in at least one embodiment of the present disclosure, the allowable attempt limit of inputting the fingerprints by the user may be preset; and within the preset attempt limit, if the fingerprint sequence inputted by the user is the same as the first fingerprint sequence, the unlocking of the touch screen is determined. The preset attempt limit may be set according to actual demands of users. For instance, the user may set the preset attempt limit as five, in the actual unlocking process, the user has the opportunity of trying to input five fingerprint sequences; if the fingerprint sequence inputted by the user after five times is still different from the first fingerprint sequence after comparison, the mobile phone executes a forced shutdown for example; and when the mobile phone is turned on again, the user needs to input the fingerprint sequence again. For instance, when the touch screen is designed by utilization of the method provided by an embodiment of the present disclosure, the power-on password may also be set to be the fingerprint sequence the same as the first fingerprint sequence. In this case, when the fingerprint sequence inputted by the user is different from the first fingerprint sequence, the mobile phone cannot boot properly.

Taking the case that the touch screen is a mobile phone as an example, in practice, a user may apply the fingerprint recognition method, for the touch screen provided by an embodiment of the present disclosure, to the entire mobile phone or the unlocking function of some Apps requiring special protection. Thus, the security level of fingerprint passwords can be greatly improved; the leakage of personal information in the mobile phone and the cracking of various types of accounts can be effectively avoided; and hence the property safety of the user can be guaranteed.

As illustrated in FIG. 4, when the fingerprint sequence inputted by the user is the same as the second fingerprint sequence, the secrete SOS mode is turned on or an alarm is sent, or else there is no response. When the user encounters a personal safety problem or is threatened, the user can input the fingerprint sequence the same as the second fingerprint sequence to turn on the secrete SOS mode or give out an alarm, so that the user can give an alarm or ask for help secretly in dangerous circumstances, and hence the personal safety of the user can be guaranteed.

Figure 5:
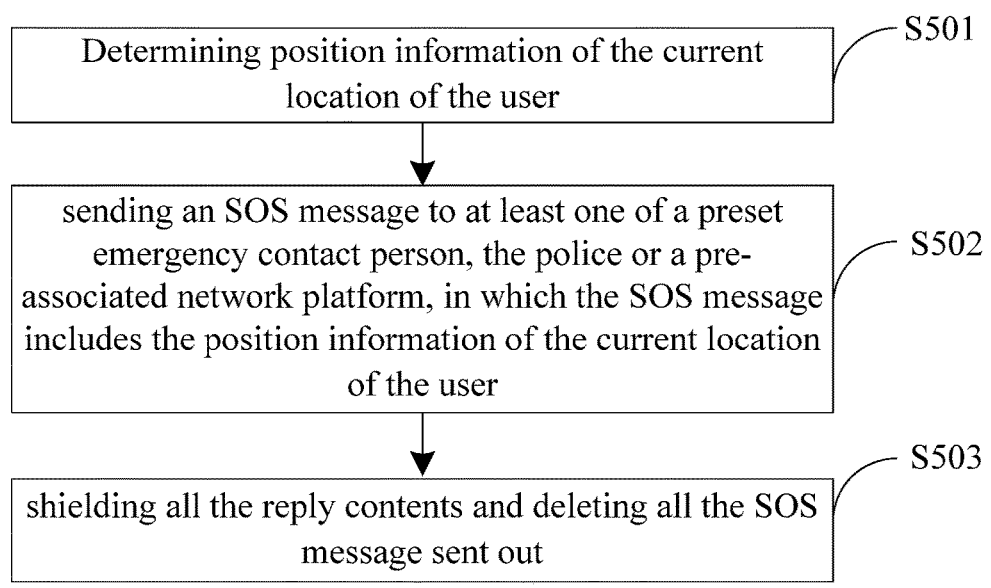
FIG. 5 is a flow diagram of a method for operating a touch screen after a secrete SOS mode is turned on in an embodiment of the present disclosure.

For instance, as illustrated in FIG. 5, in at least one embodiment of the present disclosure, after the secrete SOS mode is turned on, the method may further comprise the following operations: S501, determining position information of the current location of the user; S502, sending an SOS message to at least one of a preset emergency contact person, the police or a pre-associated network platform, in which the SOS message includes the position information of the current location of the user; and S503, shielding all the reply contents and deleting all the SOS message sent out.

For instance, when the fingerprint sequence inputted by the user is the same as the second fingerprint sequence, an alarm device is excited or a secrete SOS system is excited in the case of not being discovered by a criminal offender; and after the alarm device is excited, the mobile phone will give an alarm to threaten the criminal offenders, and hence the user can cause the attention of nearby masses to get help. When the secrete SOS system is excited, the position information of the current location of the user is determined by the mobile phone by the positioning of, for instance, a global positioning system (GPS).

Subsequently, for instance, the mobile phone may periodically send the SOS message to the preset emergency contact person and the police, and the SOS message includes the position information of the current location of the user. In specific implementation, the periodical sending out of the SOS message to the preset emergency contact and the police through the mobile phone can obtain better rescue. Of course, in a design process, the SOS message may also include the basic information of the user. For instance, the basic information of the user includes preset information of the user such as name, photo and height. Meanwhile, for instance, the mobile phone may also periodically send the SOS message to the pre-associated network platform such as Weibo and Wechat circuit of the user, so as to ask for help from nearby people at the current location, and hence the opportunity of being rescued can be increased.

After sending the SOS message, the mobile phone shields all the reply contents and delete all the SOS message that is sent out, so as to ensure the secretiveness of the entire SOS process. In addition, in order to reduce the energy consumption on other applications except the SOS activity, the method provided by at least one embodiment of the present disclosure may comprise: entering an energy saving mode in the process of shielding all the reply contents and deleting all the SOS messages.

Figure 6:
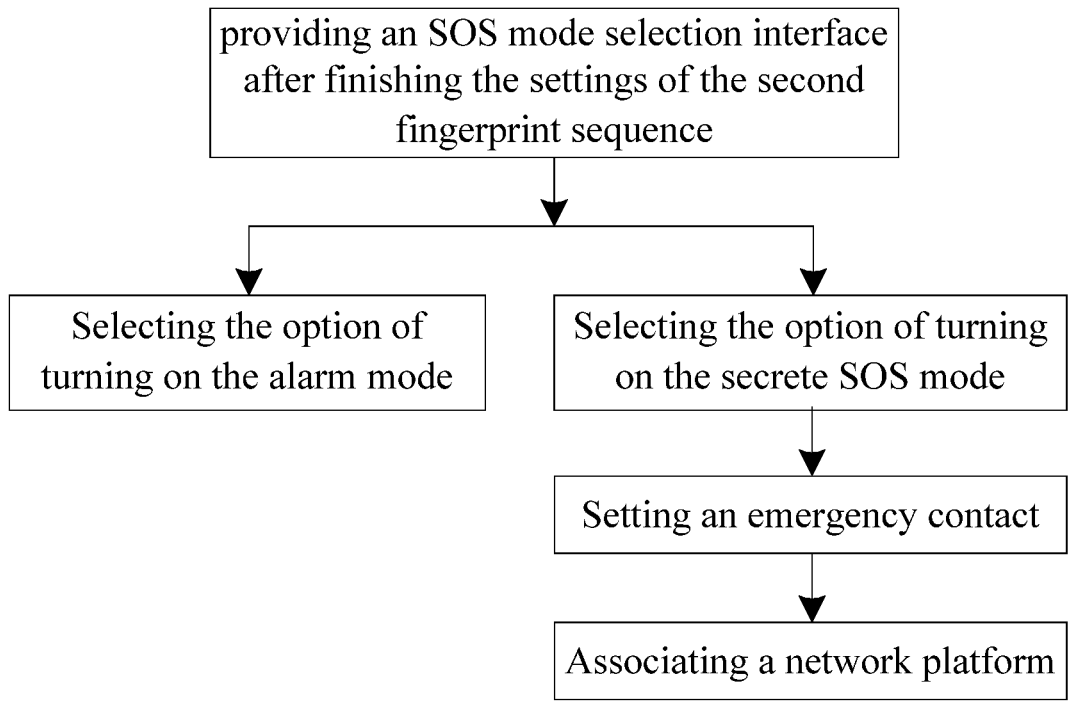
FIG. 6 is a flow diagram of a method for presetting an emergency contact and being pre-associated with a network platform in an embodiment of the present disclosure.

As illustrated in FIG. 6, in at least one embodiment of the present disclosure, the method of presetting the emergency contact person and the pre-associated network platform may include: providing an SOS mode selection interface after finishing the settings of the second fingerprint sequence, wherein the SOS mode selection interface includes two options, namely, the option of turning on the alarm mode and the option of turning on the secret SOS mode; and providing an interface for setting the emergency contact person and an interface for setting a pre-associated network platform after the user selects the option of turning on the secret SOS mode.

For instance, when the user selects the option of turning on the alarm mode, for instance, in specific implementation, a hook is drawn in front of the option of turning on the alarm mode, so an alarm device is excited and then the mobile phone gives an alarm when the fingerprint sequence inputted by the user is the same as the fingerprint sequence of the second fingerprint sequence.

For instance, when the user selects the option of turning on the secrete SOS mode, for instance, in specific implementation, a hook is drawn in front of the option of turning on the secrete SOS mode; when the user selects the option of turning on the secrete SOS mode, an address book interface is popped up, and the user selects an existing contact person as the emergency contact person on the interface; and subsequently, an SOS form selection interface is popped up, and the user may select to send the SOS message in the form of SMS on the interface and may pre-edit the content of the SOS SMS. After the emergency contact person is set, an interface of associating the network platform is provided, and the user may associate in advance the mobile phone with the network platform on the interface, and may also pre-edit the content required to be sent in the SOS condition after the process of associating. Subsequently, when the fingerprint sequence inputted by the user is the same as the fingerprint sequence of the second fingerprint sequence, a secrete SOS system is excited.

Figure 7:
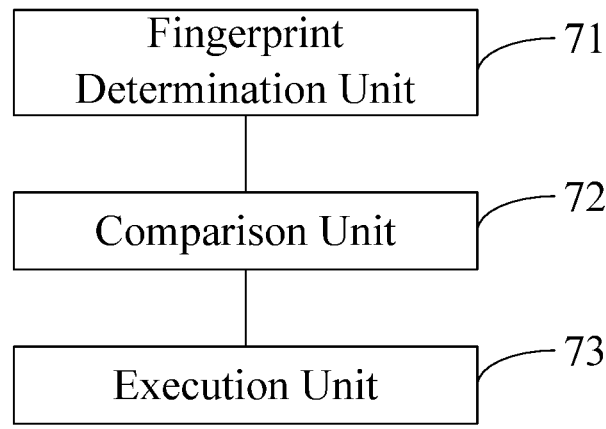
FIG. 7 is a schematic diagram of a fingerprint recognition device for a touch screen provided by an embodiment of the present disclosure.

As illustrated in FIG. 7, at least one embodiment of the present disclosure further provides a fingerprint recognition device for a touch screen. The device comprises: a fingerprint determination unit 71 configured to determine a fingerprint code inputted by a user; a comparison unit 72 configured to compare the fingerprint code inputted by the user with at least two preset fingerprint codes; and an execution unit 73 configured to execute an operation corresponding to one fingerprint code in a case where the fingerprint code inputted by the user is the same as one preset fingerprint code.

For instance, in at least one embodiment of the present disclosure, the fingerprint code may include a fingerprint sequence, and the fingerprint sequence is a sequence formed by the arrangement of No. 1 to No. N (in which N>2) fingerprints in order (namely a sequence formed by the arrangement of fingerprints from the $1^{st}$ fingerprint to the $N^{th}$ fingerprint). Moreover, the fingerprint determination unit 71 in the embodiment of the present disclosure may also be configured to receive fingerprints inputted by the user, and determine the end of fingerprint input of the user when a following fingerprint is not received within a preset time period, and arrange all the fingerprints that are received in a sequence according to an order of receiving the fingerprints, and determine the fingerprints arranged in accordance with the sequence as the fingerprint sequence inputted by the user.

For instance, in at least one embodiment of the present disclosure, the foregoing one fingerprint code may include a fingerprint sequence, and the fingerprint sequence is a sequence formed by the arrangement of No. 1 to No. N fingerprints in order (namely from the $1^{st}$ fingerprint to the $N^{th}$ fingerprint). Moreover, the comparison unit 72 in the embodiment of the present disclosure may be configured to: compare the number of fingerprints in the fingerprint sequence inputted by the user with the number of fingerprints in the preset fingerprint sequences, determine the preset fingerprint sequences of which the number of fingerprints is the same as the number of fingerprints in the fingerprint sequence inputted by the user, and take the preset fingerprint sequences that are determined as fingerprint sequences to be compared; and compare the fingerprint sequence inputted by the user with the fingerprint sequences to be compared in turn according to an order of the fingerprint sequences to be compared, and directly end the comparison process if the fingerprint sequence inputted by the user is the same as one fingerprint sequence in the fingerprint sequences to be compared.

For instance, in at least one embodiment of the present disclosure, the at least two foregoing preset fingerprint codes may include at least a first fingerprint code group and a second fingerprint code group; both the first fingerprint code group and the second fingerprint code group each include at least one fingerprint code; and the execution unit 73 may be configured to: perform user identification when the fingerprint code inputted by the user is the same as the one fingerprint code in the first fingerprint code group, and turn on a secrete SOS mode or give out an alarm when the fingerprint code inputted by the user is the same as the one fingerprint code in the second fingerprint code group.

For instance, in at least one embodiment of the present disclosure, the execution unit 73 is further configured to: perform user identification when the fingerprint code inputted by the user within a preset attempt limit is the same as the one fingerprint code in the first fingerprint code group.

For instance, in at least one embodiment of the present disclosure, after the secrete SOS mode is turned on, the execution unit 73 may also be configured to: determine position information of the current location of the user, send an SOS message to at least one of a preset emergency contact person, the police or a pre-associated network platform, in which the SOS message includes the position information of the current location of the user, and shield all the reply contents and delete all the SOS message.

For instance, in at least one embodiment of the present disclosure, the execution unit 73 is further configured to: periodically send the SOS message to at least one of the preset emergency contact person, the police or the pre-associated network platform.

For instance, the fingerprint determination unit may adopt a fingerprint scanner, a fingerprint acquisition instrument, or a unit having fingerprint determination function. For instance, the comparison unit may be a comparer, a comparison circuit or a similar unit having data comparison function. For instance, the execution unit may be a central processing unit (CPU) or an execution unit in other forms having instruction execution capability.

At least one embodiment of the present disclosure further provides a touch screen, which comprises the fingerprint recognition device provided by any of the foregoing embodiments.

For instance, the mobile phone may be any product or component with touch function such as a mobile phone or a personal digital assistant (PDA). The embodiments of the fingerprint recognition device in the touch screen may refer to the above description. No further description will be given here.

In summary, embodiments of the present disclosure provide fingerprint recognition method and device for a touch screen, and a touch screen. The fingerprint recognition method for the touch screen comprises: determining a fingerprint code inputted by a user; and comparing the fingerprint code inputted by the user with at least two preset fingerprint codes, and in a case where the fingerprint code inputted by the user is the same as the one fingerprint code in the at least two preset fingerprint codes, executing an operation corresponding to the one fingerprint code. As a plurality of fingerprint codes are set in an embodiment of the present disclosure, compared with the technology of adopting the single fingerprint, the embodiment of the present disclosure can achieve a variety of functions, for instance, may give an alarm in case of emergency through fingerprint recognition. In addition, the execution of the operation corresponding to the fingerprint through fingerprint recognition is more convenient and safer compared with direct making a call. Compared with the means of executing corresponding operations through common buttons in the state of art, the embodiment of the present disclosure can effectively avoid misoperation, as the buttons may be touched by the user when it is not necessary. Moreover, when the fingerprint code inputted by the user includes a plurality of fingerprints in the embodiment of the present disclosure, compared with the means of recognizing the single fingerprint in the state of art, the embodiment of the present disclosure can greatly improve the security level of fingerprint passwords, effectively avoid the leakage of personal information of the user and the cracking of various types of accounts, and hence can better ensure the property safety of the user.

Obviously, various modifications and changes can be made to the present disclosure by those skilled in the art without departing from the spirit and scope of the present disclosure. Therefore, if the modifications and deformations of the present disclosure fall within the scope of the accompanying claims of the present disclosure and equivalents thereof, the present disclosure is also intended to include the modifications and deformations.

The application claims priority to the Chinese patent application No. 201510600149.8, filed Sep. 18, 2015, the disclosure of which is incorporated herein by reference as part of the application.

What is claimed is:

1. A fingerprint recognition method for a touch screen, comprising:
   determining a fingerprint code inputted by a user;
   comparing the fingerprint code inputted by the user with at least two preset fingerprint codes; and
   in a case where the fingerprint code inputted by the user is the same as one fingerprint code in the at least two preset fingerprint codes, executing an operation corresponding to the one fingerprint code,
   wherein the one fingerprint code in the at least two preset fingerprint codes includes a fingerprint sequence formed by a plurality of fingerprints input by a user; the fingerprint sequence is a sequence formed by arranging the plurality of fingerprints entered by the user in a sequence according to an order the fingerprints are input,
   wherein determining the fingerprint code inputted by the user includes determining a fingerprint sequence inputted by the user, and
   wherein determining the fingerprint sequence inputted by the user comprises:
      receiving fingerprints inputted by the user,
      arranging the fingerprints that are received in a sequence according to an order the fingerprints are received, and
      determining as the fingerprint sequence inputted by the user the fingerprints arranged in the sequence;
   wherein fingerprint input is ended in a case where a time interval between a time when a current fingerprint of the fingerprints inputted by the user is inputted and a time when a next fingerprint, which is adjacent to the current fingerprint, of the fingerprints inputted by the user is inputted exceeds a preset time period.

2. The method according to claim 1, wherein the at least two preset fingerprint codes include at least a first fingerprint code group and a second fingerprint code group;
   both the first fingerprint code group and the second fingerprint code group each include at least one fingerprint code;
   user identification is performed in a case where the fingerprint code inputted by the user is the same as the one fingerprint code in the first fingerprint code group; and
   a secrete SOS mode is turned on or an alarm is sent in a case where the fingerprint code inputted by the user is the same as the one fingerprint code in the second fingerprint code group.

3. The method according to claim 2, wherein user identification is performed in a case where the fingerprint code inputted by the user within a preset attempt limit is the same as the one fingerprint code in the first fingerprint code group.

4. The method according to claim 2, after turning on the secrete SOS mode, further comprising:
   determining position information of a current location of the user; and
   sending an SOS message to at least one of a preset emergency contact person, police or a pre-associated network platform, in which the SOS message includes the position information of the current location of the user.

5. The method according to claim 4, after sending the SOS message, further comprising:
   shielding all reply contents and deleting the SOS message.

6. The method according to claim 1, wherein comparing of the fingerprint code inputted by the user with the at least two preset fingerprint codes includes:
   comparing the fingerprint sequence inputted by the user with the preset fingerprint sequence.

7. The method according to claim 6, wherein
   the one fingerprint code in the at least two preset fingerprint codes includes preset fingerprint sequences, a number of fingerprints in the fingerprint sequence inputted by the user is compared with a number of fingerprints in the preset fingerprint sequences; one or more preset fingerprint sequences of which the number of fingerprints is the same as the number of fingerprints in the fingerprint sequence inputted by the user are determined; the one or more preset fingerprint sequences that are determined are taken as one or more fingerprint sequences to be compared;
   the fingerprint sequence inputted by the user is compared with the fingerprint sequences to be compared in turn according to an order of the one or more fingerprint sequences to be compared; and
   comparing is directly ended if the fingerprint sequence inputted by the user is the same as one fingerprint sequence in the fingerprint sequences to be compared.

8. The method according to claim 1, wherein each of the preset fingerprint codes includes a fingerprint sequence formed by a plurality of fingerprints; and
   the fingerprint sequence is a sequence formed by an arrangement of No. 1 to No. N fingerprints in order.

9. A fingerprint recognition device for a touch screen, comprising:
   a fingerprint determination unit configured to determine a fingerprint code inputted by a user;
   a comparison unit configured to compare the fingerprint code inputted by the user with at least two preset fingerprint codes; and
   an execution unit configured, in a case where the fingerprint code inputted by the user is the same as one fingerprint code in the at least two preset fingerprint codes, to execute an operation corresponding to the one fingerprint code,
   wherein the one fingerprint code in the at least two preset fingerprint codes includes a fingerprint sequence formed by a plurality of fingerprints input by a user; the fingerprint sequence is a sequence formed by arranging the plurality of fingerprints entered by the user in a sequence according to an order the fingerprints are input,
   the fingerprint determination unit is further configured to determine a fingerprint sequence inputted by the user, and
   the fingerprint determination unit is further configured to:
      receive fingerprints inputted by the user,
      arrange the fingerprints that are received in a sequence according to an order the fingerprints are received, and
      determine as the fingerprint sequence inputted by the user the fingerprints arranged in the sequence;
   wherein fingerprint input is ended in a case where a time interval between a time when a current fingerprint of the fingerprints inputted by the user is inputted and a time when a next fingerprint, which is adjacent to the current fingerprint, of the fingerprints inputted by the user is inputted exceeds a preset time period.

10. The device according to claim 9, wherein the at least two preset fingerprint codes include at least a first fingerprint code group and a second fingerprint code group; both the first fingerprint code group and the second fingerprint code group each include at least one fingerprint code; and the execution unit is configured to:
perform user identification in a case where the fingerprint code inputted by the user is the same as the one fingerprint code in the first fingerprint code group; and
turn on a secrete SOS mode or give out an alarm in a case where the fingerprint code inputted by the user is the same as the one fingerprint code in the second fingerprint code group.

11. The device according to claim 10, wherein the execution unit is further configured to: perform user identification in a case where the fingerprint code inputted by the user within a preset attempt limit is the same as the one fingerprint code in the first fingerprint code group.

12. The device according to claim 10, wherein the execution unit is further configured, after the secrete SOS mode is turned on, to:
determine position information of the current location of the user; and
send an SOS message to at least one of a preset emergency contact person, police or a pre-associated network platform, in which the SOS message includes the position information of the current location of the user.

13. The device according to claim 9, wherein the comparison unit is further configured to compare the fingerprint sequence inputted by the user with the preset fingerprint sequence.

14. The device according to claim 13, wherein the one fingerprint code in the at least two preset fingerprint codes includes preset fingerprint sequences, and the comparison unit is further configured to:
compare a number of fingerprints in the fingerprint sequence inputted by the user with a number of fingerprints in the preset fingerprint sequences, determine one or more preset fingerprint sequences of which the number of fingerprints is the same as the number of fingerprints in the fingerprint sequence inputted by the user, and take the one or more preset fingerprint sequences that are determined as one or more fingerprint sequences to be compared; and
compare the fingerprint sequence inputted by the user with the fingerprint sequences to be compared according to an order of the one or more fingerprint sequences to be compared, and directly end comparing if the fingerprint sequence inputted by the user is the same as one fingerprint sequence in the fingerprint sequences to be compared.

15. The device according to claim 9, wherein each of the preset fingerprint codes includes a fingerprint sequence formed by a plurality of fingerprints; and the fingerprint sequence is a sequence formed by an arrangement of No. 1 to No. N fingerprints in order.

16. A touch screen, comprising the fingerprint recognition device according to claim 9.

* * * * *